April 3, 1962 — I. V. GLEIM — 3,028,001
PACKAGING DEVICE
Filed Sept. 2, 1960 — 2 Sheets-Sheet 1
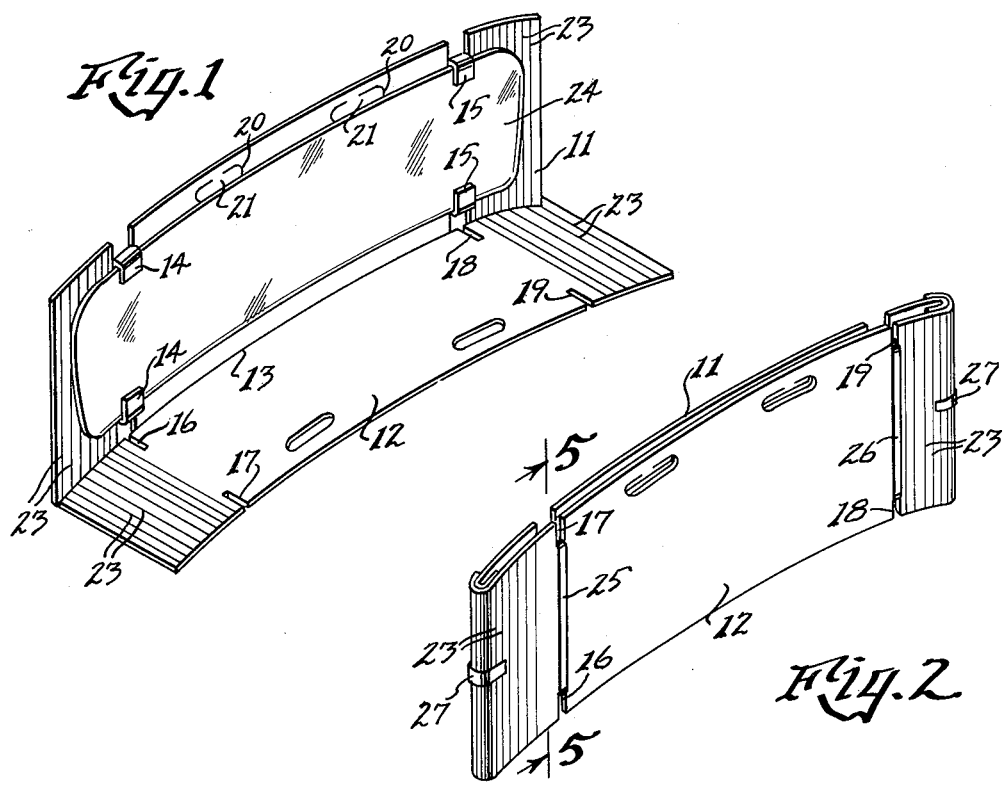
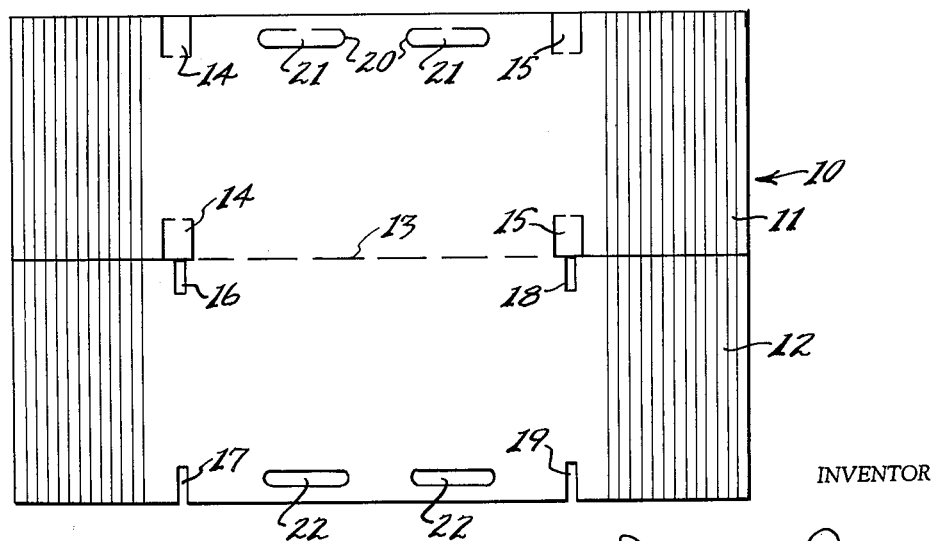
INVENTOR
Irvin V. Gleim

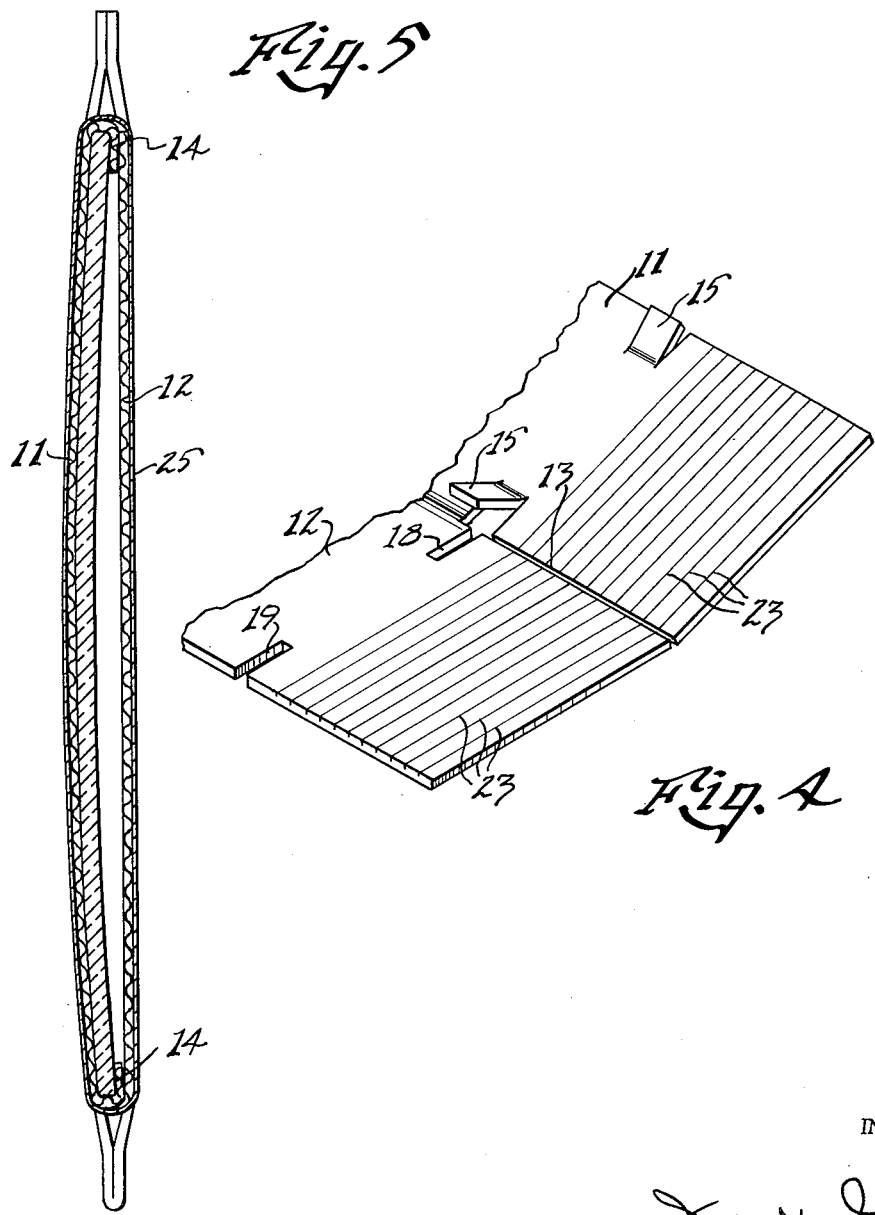

United States Patent Office 3,028,001
Patented Apr. 3, 1962

3,028,001
PACKAGING DEVICE
Irvin V. Gleim, Dayton, Ohio, assignor to The Mead Corporation, Dayton, Ohio, a corporation of Ohio
Filed Sept. 2, 1960, Ser. No. 53,757
2 Claims. (Cl. 206—62)

The present invention relates to a packaging device for fragile plate-like articles and more particularly to a packaging device for front and rear automobile windshields, glass plates, and glass plate members of various curvatures.

Generally there is provided a packaging device which is particularly designed for the protection in shipping of curved windshields and particularly rear window shields and like fragile structures which, although possessing great strength, must be protected in shipping from edge contact with other articles or with the vehicle in which they may be transported since the edge portions of such glass members are particularly susceptible to chipping prior to their ultimate mounting in the vehicles for which they are intended. The present device comprises a paperboard blank longitudinally and centrally scored to form front and rear panels. The front panel is provided inwardly of each end thereof with a pair of opposed tabs, the opposed tabs being formed in the longitudinal edge portions of such panel. The rear panel is provided in its longitudinal edge portions with slots each of which registers with one of the tabs when the device is folded along its longitudinal fold line. Each end portion of each panel is provided with transverse scorings for a purpose later to be described. The front panel is provided with a pair of handle openings having flaps remaining therein while the other panel is provided with a pair of registering openings. The device is such that a curved windshield and particularly a wrap-around type of rear window shield of an automobile may be placed upon the front panel and the tabs turned over the edges of the windshield or rear window shield whereupon the rear panel of the paperboard blank may then be folded against the glass and tapes extended through the slots and over the tabs to securely hold the glass in position between the two panels. In such position the scored end portions of the panels may be folded over the glass and then taped. The tabs of the handle openings may then be extended through the registering openings in the other panel to provide a comfortable pair of hand grips. Thereafter the panels may be stapled to each other beyond the edges of the glass mounted therebetween thus forming a secure protection for the glass member mounted therein.

It is accordingly an object of the invention to provide a novel packaging device for curved glass members or the like.

Another object of the invention is to provide a device of the character set forth which is simple in construction, inexpensive to manufacture and yet effective and efficient in use.

Another object of the invention is to provide a device of the character set forth which, while having little inherent structural strength, nevertheless protects the glass which is placed and packaged therein.

Still another object of the invention is to provide, in a device of the character set forth, novel means for mounting a glass window or the like between two panels forming part of the invention.

Other and further objects of the invention will become apparent from a reading of the following specification taken in conjunction with the drawings, in which:

FIGURE 1 is a perspective view of an embodiment of the invention illustrating a glass window or the like mounted upon one of the panels while the other panel remains open;

FIGURE 2 is a view similar to FIGURE 1 but illustrating the device when fully closed;

FIGURE 3 is an enlarged plan view of the device in completely unfolded condition;

FIGURE 4 is a further enlarged fragmentary perspective view illustrating a scored end structure forming a part of the invention; and, FIGURE 5 is a greatly enlarged sectional view taken substantially along line 5—5 of FIGURE 2.

Referring more particularly to the drawings, there is shown therein a packaging device for curved glass articles such as front and rear windshields, windows, and the like comprising a rectangular blank generally indicated at 10 which is centrally divided into a front panel 11 and a rear panel 12 by a longitudinally extending score line 13.

Formed in the longitudinal edge portions of the panel 11 in spaced relation to the ends thereof are two pairs of protective tabs 14 and 15.

The panel 12 is provided in its longitudinal edge portions with four slots 16, 17, 18 and 19, the slots 16 and 17 registering with the flaps 14 and the slots 18 and 19 registering with the flaps 15 when the device is in folded condition as shown in FIGURE 2.

The outer edge portion of the panel 11 is provided, inwardly of the tabs 14, with a pair of handle openings 20 each with tab 21 attached to the panel. The panel 12 is provided with a pair of handle openings 22 which, when the device is in folded condition as illustrated in FIGURE 2, register with the openings 20. Each end portion of each of the panels 11 and 12 is provided with a plurality of closely aligned transversely extending score lines 23.

In use, it will be apparent that the glass plate 24 or the like which is to be protected by the device may first be placed upon the panel 11 whereupon the tabs 14 are folded inwardly thereover after which the panel 12 is brought into contact with the member 24 and an elongated tape 25 is extended through the slots 16 and 17, over the outer faces of both of the panels 11 and 12 and over the outer sides of the tabs 14, all as indicated in FIGURES 2 and 5. A like tape 26 is extended through the slots 18 and 19 and over the tabs 15 and the outer faces of the panels 11 and 12, as shown in FIGURE 2.

Thereafter, the end portions of one of the panels are bent over the end portions of the glass member 24 and the end portions of the other panel are then bent over the thusly bent portions of the first panel, all as indicated in FIGURE 2 after which such end portions are interconnected by a tape 27 centrally placed at the ends of the thus assembled package, as indicated in FIGURE 2. If desired, staples may then be utilized to interconnect the panels 11 and 12 at the border portions thereof where they are in face to face relationship above, below and at the sides of the glass member 24. It will be apparent that the fold lines 23 are extremely useful in the bending process just above described.

While the product herein described is for the purpose of illustration only, it is to be understood that the present invention includes all modifications and equivalents which fall within the scope of the invention which is defined by the appended claims.

What is claimed is:

1. A packaging device for windshields and the like having varying lengths, widths and curvatures comprising a rectangular body having a centrally disposed longitudinal fold line dividing the same into a pair of equally dimensioned panels, at least two pairs of relatively wide tabs formed in one of said panels and oppositely positioned along the longitudinal edges thereof and foldable to encompass portions of the upper and lower edge portions of a windshield, the other of said panels having at least two pairs of relatively narrow slots inwardly extending from and positioned along the longitudinal edges thereof and each registering with a medial portion of one of said tabs when said panels are in face-to-face relationship with said tabs being held in edge-encompassing relation to said windshield by said other panel, and means for retaining said panels upon opposed sides of said windshield, said means including tapes extending through opposed pairs of slots and over the associated tabs.

2. A device as defined in claim 1 wherein one of said panels is provided with hand openings in the outer longitudinal edge portion thereof, flaps secured in each of said hand openings, and wherein said other panel is provided with registering hand openings adapted to register with said first-mentioned hand openings when said panels are in face-to-face relationship, said flaps being receivable in said registering hand openings to provide hand grips.

References Cited in the file of this patent
UNITED STATES PATENTS
2,917,166     Lidgard _____ Dec. 15, 1959